Aug. 23, 1949.   C. D. VROOMAN   2,479,795
BRAKE COOLER
Original Filed July 12, 1943
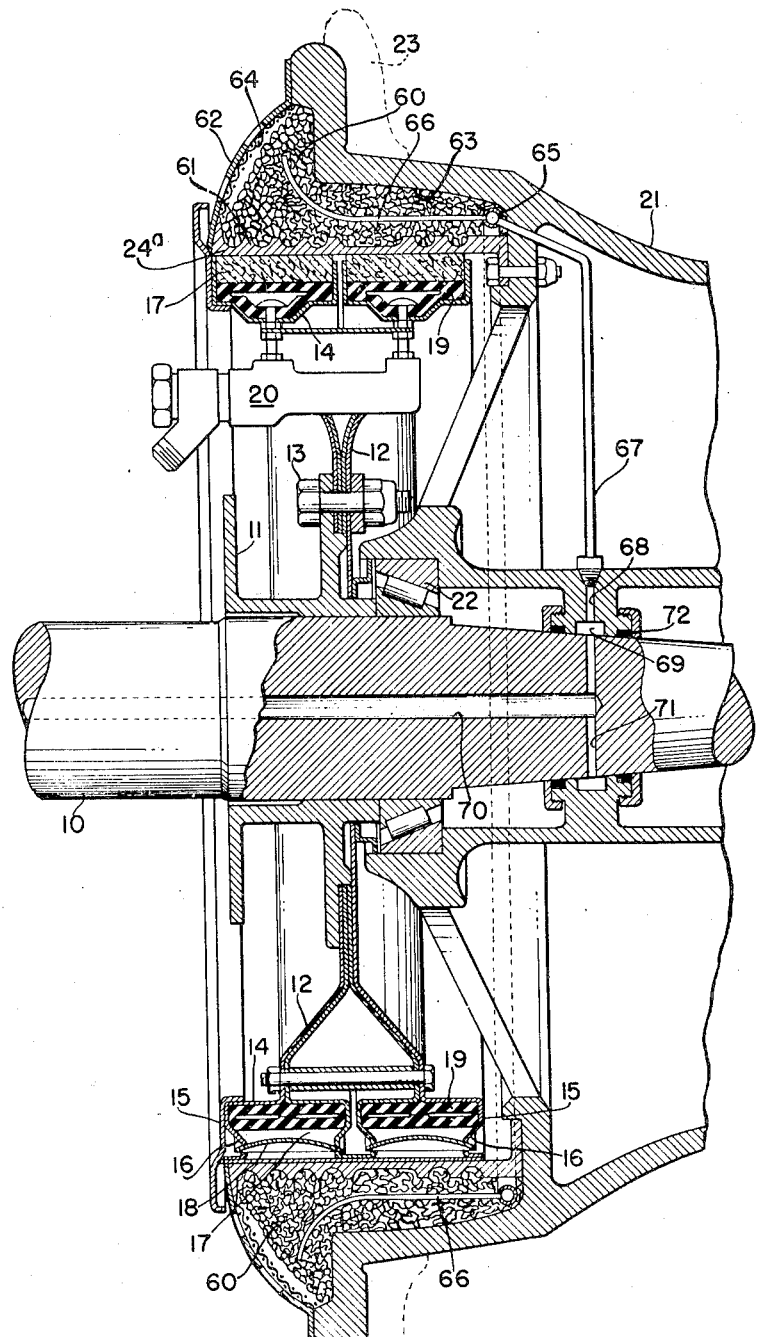
INVENTOR.
CARLL D. VROOMAN
BY
George S. Sullivan
Agent Patented Aug. 23, 1949

2,479,795

UNITED STATES PATENT OFFICE 2,479,795

BRAKE COOLER

Caril D. Vrooman, La Crescenta, Calif., assignor to Lockheed Aircraft Corporation, Burbank, Calif.

Original application July 12, 1943, Serial No. 494,330. Divided and this application July 13, 1945, Serial No. 604,844

7 Claims. (Cl. 188—264)

This invention relates to brakes, and relates more particularly to brake mechanisms embodying heat dissipating means. A general object of the invention is to provide a brake mechanism having simple, practical and effective means for dissipating the heat generated as a result of the braking operation.

This application is a division of United States Letters Patent No. 2,409,099, issued October 8, 1946.

The present invention, while not confined to any given application or field, is well suited for embodiment in the brake systems of aircraft landing gear. Accordingly, the invention will herein be described as employed in such systems, it being understood this is merely one typical application and is not to be construed as limiting either the scope or application of the invention.

When the brakes of aircraft landing gear are operated, high temperatures are created in the mechanism, producing rapid deterioration of the expander tubes, brake lining, tires, etc. Only a small portion of the heat energy created is immediately dissipated by atmospheric convection and radiation, and the balance is absorbed by the brake mechanism with damaging results.

An important object of the invention is to provide a brake mechanism having means which maintains a substantial mass of water adsorbent material to close proximity to the brake drum, whereby the water in the mass is driven off in the form of vapor to efficiently transfer heat from the brake parts upon operation of the brake mechanism.

A further object of the invention is to provide a brake mechanism of the character referred to incorporating means for supplying water to the contained mass of water adsorbent material to condition or regenerate the same. The water may be supplied directly to the adsorbent material from a container or hose, or may be supplied from a source of water under pressure carried by the airplane.

Other objectives and features of the invention will be readily understood from the following detailed description of a typical preferred form of the invention wherein reference will be made to the accompanying drawings in which the figure is a longitudinal sectional view of a brake and wheel mechanism embodying features of the invention.

The typical landing wheel and brake assembly illustrated in the drawing includes a stationary axle 10 and a brake supporting structure secured to the axle. This structure includes a hub 11 keyed to the axle 10 and an annular carrier 12 secured to the hub by bolts 13. A rim 14 is secured on the carrier 12 and has two continuous channels 15 with opposing lugs 16 on their side walls. Segmental shoes 17 of friction material are engaged in the channels 15 and have reduced end portions cooperating with the lugs 16. Inwardly bowed leaf springs 18 have their ends anchored in the lugs 16 and bear inwardly against the end portions of the shoes 17 to urge the shoes inwardly. Expander tubes 19 of synthetic rubber or similar elastic material are provided in the channels 15 at the inner sides of the series of shoes 17. A manifold fitting 20 communicates with the interiors of the expander tubes 19 and fluid pressure is supplied to the fitting to expand the tubes. In practice, the usual hydraulic brake operating system of the aircraft may supply the actuating pressure to the expander tubes. The present invention is not primarily concerned with the details of the hydraulic brake operating system, and such details are omitted from the present description.

A wheel assembly 21 is supported on the axle 10 by bearings 22 and the rim of the wheel carries a suitable tire 23. A brake drum 24a is bolted to an end of the wheel assembly to extend axially therefrom and surround the brake shoes 17. Upon the delivery of fluid pressure to the interiors of the expander tubes 19, the tubes force the shoes 17 radially outward into braking contact with the drum 24a. The structure thus far described may be considered as conventional.

In accordance with the present invention, a mass 60 of granular water adsorbent material is contained in adjacent relation to the brake drum 24a, shoes 17 and other brake parts, to effect an efficient cooling of the brake assembly. An annular space 63 occurs between the rim of the wheel 21 and the periphery of the drum 24a. The inner extremity of this annular space is closed by the drum 24a and the inwardly converging wheel, and a perforated plate 62 is arranged across the outer end or mouth of the space 63. A screen 64 of glass fabric or other suitable material, is arranged at the inner side of the plate 62 to prevent the displacement or loss of the granular particles from the space 63. The periphery or external surface of the brake drum 24a preferably has heat radiating fins 61 extending into the mass of water adsorbent material.

The mass 60 of adsorbent material preferably completely occupies the space 63. I prefer to employ silica gel ($SiO_2$) as the water adsorbent material. Silica gel has the property of absorbing water in a volume of 40% of its dry weight. To drive off this moisture in the form of water vapor, heat of vaporization must be added to the mass at a temperature of 212° Fahrenheit or higher. The moisture content of the silica gel is unaffected by the maximum range of atmospheric temperatures, and assuming that the material has been regenerated during or subsequent to a prior operation of the brake means, it remains in the operative moisture-containing condition indefinitely. The adsorbent mass 60 may be regenerated immediately after losing its moisture content by simply supplying it with water from an external source. The preferred adsorbent material 60 is unaffected by the maximum temperatures encountered as a result of brake operation, and is chemically inert so that it does not attack or corrode the adjacent parts.

The water adsorbent mass may be regenerated subsequent to each use or operation of the brake system by merely supplying it with water through the perforated sheet or closure 62. As illustrated in the drawing, a water supply system may be provided to facilitate the delivery of the regenerating water to the mass 60. The supply system includes an annular manifold 65 surrounding the brake drum 24 to be within the space 63. Circumferentially spaced distribution tubes or jets 66 extend forwardly from the manifold 65 and pass through or into the mass 60. The jets 66 have spaced perforations for discharging the water directly into the mass 60.

A tube and port system is provided to conduct water to the manifold 65. A conduit or line 67 extends from the manifold 65 to a radial port 68 in the hub of the wheel 21. The port 68 communicates with an annular groove 69 in the interior of the hub. A central longitudinal passage 70 extends through the axle 10 to a plurality of spaced radial ports 71. The ports 71 connect the annular groove 69 with the central passage 70. Packing glands 72 are provided on the wheel hub at opposite sides of the groove 69 to prevent the leakage of water from around the axle.

Water may be periodically supplied to the passage 70 under selected pressure by any suitable means. If desired, the automatic water supplying and measuring means forming the subject matter of Patent No. 2,409,099, may be employed to communicate with the passage 70 for the purpose of supplying a measured quantity of water to the mass of adsorbent material 60 during or subsequent to each full operation of the brake system. However, the water adsorbent material will automatically regenerate itself with atmospheric moisture, and in any event, water may be readily supplied to the mass at any required time by merely passing it through the plate 62 and screen 64.

It is believed that the operation of the brake cooling means will be apparent from the foregoing description. The mass of water adsorbent material 60, under normal atmospheric conditions, will remain in an effective state to immediately dissipate a major portion of the heat resulting from brake operation. When the brake means is operated and the brake parts become heated, the water in the mass 60 is driven off in the form of vapor or steam to effect an efficient transference of the heat energy accompanying operation of the brake. It will be observed that this brake cooling action is entirely automatic, requiring no manual control or attention. However, as above described, it may be found necessary or desirable to regenerate the mass 60 from time to time, supplying it with water either directly or by passing water under pressure into the passage 70.

Having described only a typical form of the invention, I do not wish to be limited to the specific details herein set forth, but wish to reserve to myself any variations or modifications that may appear to those skilled in the art or fall within the scope of the following claims.

I claim:

1. In combination with a brake mechanism having parts subjected to the heat generated by the braking action; a body of silica gel, means for maintaining said body in adjacent relation to said parts, and means for supplying water to said body.

2. In a brake mechanism having a brake drum and friction means cooperable therewith, the combination of, a mass of water adsorbent granular silica gel, means for maintaining said mass in the form of an annular body in adjacent substantially concentric relation to the drum, and means for supplying water to said body.

3. In a brake mechanism having a brake drum and friction means cooperable therewith, the combination of; a mass of water adsorbent granular silica gel, and means for containing said mass in adjacent relation to the drum and friction means with at least a portion thereof exposed for the reception of moisture.

4. In a brake mechanism, a brake drum, friction means for cooperating with one surface of the drum, and a mass of granular silica gel at the other surface of the drum exposed to the atmosphere.

5. In combination, a wheel having a rim, a brake drum spaced within the rim to leave a chamber, and brake cooling means comprising a mass of granular silica gel contained in said chamber.

6. In combination, a wheel having a rim, a brake drum spaced within the rim to leave a chamber, one end of the chamber being open to the atmosphere, and brake cooling means comprising a mass of granular silica gel contained in said chamber.

7. In combination, a wheel having a rim, a brake drum spaced within the rim to leave a chamber, one end of the chamber being open to the atmosphere, and brake cooling means comprising a mass of granular silica gel contained in said chamber, and a foraminous closure for said end of the chamber to prevent displacement of said mass from the chamber.

CARLL D. VROOMAN.

REFERENCES CITED

The following references are of record in the file of this patent:

UNITED STATES PATENTS

| Number | Name | Date |
|---|---|---|
| 1,906,525 | Baykin, Jr. | May 2, 1933 |
| 2,012,662 | Frank | Aug. 27, 1935 |
| 2,041,457 | Cautley | May 19, 1936 |
| 2,111,335 | Sanford | Mar. 15, 1938 |

OTHER REFERENCES

The Story of Silica Gel, by The Silica Gel Corp., published 1930. (Copy in division 64.) Pp. 6, 15, and 16.